(12) United States Patent
Worsley et al.

(10) Patent No.: US 11,617,998 B2
(45) Date of Patent: Apr. 4, 2023

(54) METAL BORIDE AEROGELS

(71) Applicant: Lawrence Livermore National Security, LLC, Livermore, CA (US)

(72) Inventors: Marcus A. Worsley, Hayward, CA (US); Theodore F. Baumann, Discovery Bay, CA (US); Joshua Kuntz, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 306 days.

(21) Appl. No.: 16/810,672

(22) Filed: Mar. 5, 2020

(65) Prior Publication Data

US 2020/0197892 A1    Jun. 25, 2020

Related U.S. Application Data

(63) Continuation-in-part of application No. PCT/US2018/049771, filed on Sep. 6, 2018.
(Continued)

(51) Int. Cl.
*B01J 13/00* (2006.01)
*C01B 35/04* (2006.01)
(Continued)

(52) U.S. Cl.
CPC .......... *B01J 13/0091* (2013.01); *C01B 35/04* (2013.01); *C04B 35/58078* (2013.01);
(Continued)

(58) Field of Classification Search
CPC .............. C01B 35/04; C04B 35/5805; C04B 35/58057; C04B 35/58064; C04B 35/58071; C04B 35/58078; B01J 13/0091
See application file for complete search history.

(56) References Cited

U.S. PATENT DOCUMENTS 9,577,260 B2 * 2/2017 Deb ..................... H01M 4/58
9,725,332 B2   8/2017 Thevasahayam
(Continued)

FOREIGN PATENT DOCUMENTS

CN    1014865 B      3/2012
CN    106938934 A    7/2017
KR    101160140 B1   6/2012

OTHER PUBLICATIONS

Guo et al., "Synthesis of submicrometer HfB2 powder and its densification," Materials Letters, vol. 83, 2012, pp. 52-55.
(Continued)

*Primary Examiner* — Karl E Group
(74) *Attorney, Agent, or Firm* — Zilka-Kotab, P.C.

(57) ABSTRACT

A metal boride aerogel includes a three-dimensional aerogel structure comprising metal boride particles having an average diameter of less than one micron. A method is disclosed for forming a metal boride aerogel including dispersing boron nanoparticles in a solution of a metal salt, forming a boron-loaded metal oxide precursor gel using the dispersed boron nanoparticles in the solution of the metal salt, drying the boron-loaded metal oxide precursor gel to form a boron-loaded metal oxide precursor aerogel, and heating the boron-loaded metal oxide precursor aerogel to form a metal boride aerogel. The metal boride aerogel is essentially free of metal oxide.

24 Claims, 8 Drawing Sheets

Related U.S. Application Data

(60) Provisional application No. 62/558,728, filed on Sep. 14, 2017.

(51) Int. Cl.
    *C04B 35/58*     (2006.01)
    *C04B 38/00*     (2006.01)
    *B82Y 30/00*     (2011.01)

(52) U.S. Cl.
    CPC ........... *C04B 38/0045* (2013.01); *B82Y 30/00* (2013.01); *C04B 2235/421* (2013.01); *C04B 2235/5445* (2013.01); *C04B 2235/5454* (2013.01); *C04B 2235/656* (2013.01); *C04B 2235/9607* (2013.01)

(56) References Cited

U.S. PATENT DOCUMENTS

| | | |
|---|---|---|
| 2009/0029147 A1 | 1/2009 | Tang et al. |
| 2010/0267541 A1 | 10/2010 | Satcher, Jr. et al. |
| 2014/0377662 A1* | 12/2014 | Deb .................. C01B 35/04 423/276 |
| 2015/0004087 A1 | 1/2015 | Zettl et al. |
| 2015/0076987 A1 | 3/2015 | Sauti et al. |

OTHER PUBLICATIONS

Guo et al., "New Borothermal Reduction Route to Synthesize Submicrometric ZrB2 Powders with Low Oxygen Content," Journal of the American Ceramic Society, vol. 94, Nov. 2011, pp. 3702-3705.

Guo et al., "TiB2 Powders Synthesis by Borothermal Reduction in TiO2 Under Vacuum," Journal of the American Ceramic Society, vol. 97, No. 5, May 2014, pp. 1359-1362.

Cahill et al., "Ultrahigh-Temperature Ceramic Aerogels," Chemistry of Materials, vol. 31, 2019, pp. 3700-3704.

International Search Report and Written Opinion from PCT Application No. PCT/US2018/049771, dated Dec. 21, 2018.

International Preliminary Examination Report from PCT Application No. PCT/US2018/049771, dated Mar. 29, 2020.

\* cited by examiner

METAL BORIDE AEROGELS

RELATED APPLICATIONS

This application claims priority to U.S. Provisional Patent Application No. 62/558,728 filed Sep. 14, 2017, and International Application No. PCT/US2018/49771 filed Sep. 6, 2018, which are herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to aerogels, and more particularly, this invention relates to metal boride aerogels.

BACKGROUND

Metal boride ceramics, also termed ultrahigh-temperature ceramics (UHTC), such as hafnium boride, zirconium boride, and titanium boride possess a number of extraordinary qualities. They exhibit extremely high melting temperatures (>3000° C.), good thermal oxidation resistance, and electrical conductivity. As such UHTCs are good candidates for applications that involve extreme conditions, like heat shielding in hypervelocity reentry vehicles. However, metal borides also possess good thermal conductivity, which is disadvantageous for insulation applications. For example, any heat at the surface of a metal boride ceramic will likely be quickly transferred to the underlying material.

Aerogels are well-known as a class of materials with excellent insulation properties. In fact, due to the fine pore structure and highly tortuous paths in aerogels, aerogels have exhibited some of the lowest recorded thermal conductivity values. However, conventional aerogel insulation materials primarily include metal oxides having melting points substantially lower metal boride ceramic material. Recent studies of the synthesis of metal boride material has focused on synthesis of metal boride powders and the consolidation of these powders to full density. However, the powders tend to include relatively large particles (e.g., ~1 micron).

In addition, formation of metal boride ceramic material typically involves a solid-state reaction of forming a solid crystalline structure from dry, solid reactants at very high temperatures. Thus, a wet chemistry process using sol-gel processes to form an aerogel would not work in the conventional process of solid state reaction.

The process to develop an aerogel structure of low thermal conductivity formed having a thermo-resistant metal boride ceramic material remains elusive.

SUMMARY

In one inventive concept, a metal boride aerogel includes a three-dimensional aerogel structure comprising metal boride particles having an average diameter of less than one micron.

In another inventive concept, a method for forming a metal boride aerogel includes dispersing boron nanoparticles in a solution of a metal salt, forming a boron-loaded metal oxide precursor gel using the dispersed boron nanoparticles in the solution of the metal salt, drying the boron-loaded metal oxide precursor gel, and heating the dried boron-loaded metal oxide precursor gel to form a metal boride aerogel. The metal boride aerogel is essentially free of metal oxide.

Other aspects and advantages of the present invention will become apparent from the following detailed description, which, when taken in conjunction with the drawings, illustrate by way of example the principles of the invention.

DETAILED DESCRIPTION

Figure 1:
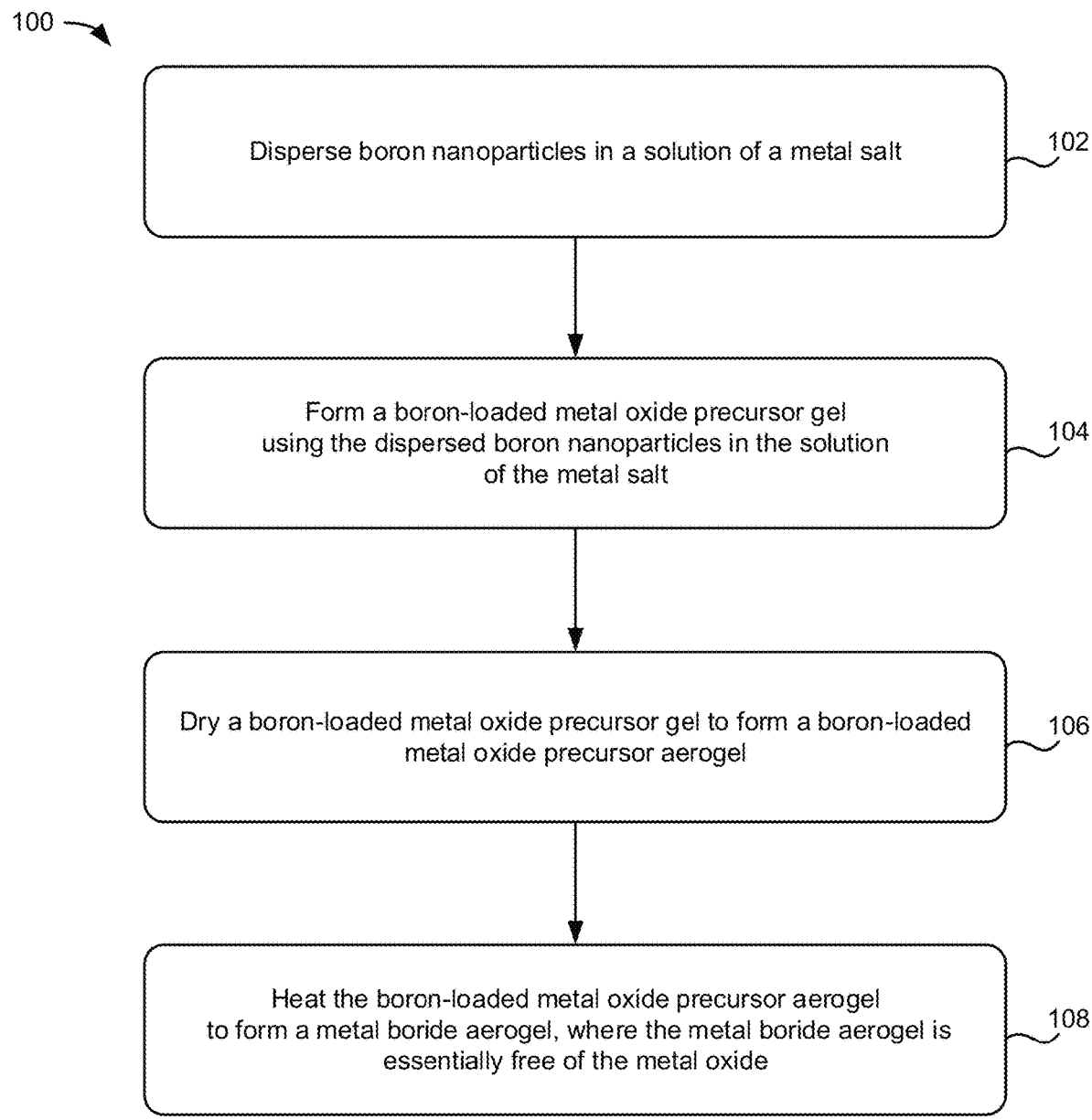
FIG. 1 is a flow diagram of a method to form metal boride aerogels, according to one inventive concept.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

It is noted that ambient room temperature may be defined as a temperature in a range of about 20° C. to about 25° C.

It is also noted that, as used in the specification and the appended claims, wt % is defined as the percentage of weight of a particular component is to the total weight/mass of the mixture. Mol % is defined as the percentage of moles of a particular component to the total moles of the mixture or compound. Atomic % (at %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

The following description discloses several preferred inventive concepts of metal boride aerogels, and systems and methods thereof.

In one general inventive concept, a metal boride aerogel includes a three-dimensional aerogel structure comprising metal boride particles having an average diameter of less than one micron.

In another general inventive concept, a method for forming a metal boride aerogel includes dispersing boron nanoparticles in a solution of a metal salt, forming a boron-loaded metal oxide precursor gel using the dispersed boron nanoparticles in the solution of the metal salt, drying the boron-loaded metal oxide precursor gel to form a boron-loaded metal oxide precursor aerogel, and heating the boron-loaded metal oxide precursor aerogel to form a metal boride aerogel. The metal boride aerogel is essentially free of metal oxide.

A list of acronyms used in the description is provided below.

3D Three-dimensional
at % Atomic percent
B @$MO_2$ Boron-loaded metal oxide
B @$HfO_2$ Boron-loaded hafnia
B @$TiO_2$ Boron-loaded titania
B @$ZrO_2$ Boron-loaded zirconia
BET Brunauer-Emmett-Teller method
BJH Barrett-Joyner-Halenda method
C Celsius
$CO_2$ Carbon dioxide
EDS Energy dispersive spectroscopy
g grams
GPa Gigapascal
$HfB_2$ Hafnium boride
$HfO_2$ Hafnium oxide, hafnia
M Metal
$MB_2$ Metal boride
$MCl_x$ Metal chloride
mg milligram
mg/$cm^3$ milligram per cubic centimeter
ml milliliters
MPa Megapascal
nm nanometer
S/cm siemens per centimeter
SEM Field emission scanning electron microscopy
TEM High resolution transmission electron microscopy
$TiB_2$ Titanium boride
$TiO_2$ Titanium oxide, titania
UHTC Ultrahigh-temperature ceramic
μl microliters
μm micron
W/m K watts per meter kelvin
$ZrB_2$ Zirconium boride
$ZrO_2$ Zirconium oxide, zirconia The following description discloses several preferred inventive concepts of metal boride aerogels that include nanoparticles much less than 1 micron (μm) in size. Some inventive concepts described herein allow metal borides to be used as thermal insulators at extreme high temperatures. Other inventive concepts provide a route to true nanoparticles of metal boride materials.

Various inventive concepts described herein present different methods to prepare metal boride aerogels. Various inventive concepts described herein synthesize and characterize monolithic, low-density metal boride aerogels. Various inventive concepts include methods to prepare metal boride aerogels in which the metal is hafnium (Hf), zirconium (Zn), titanium (Ti), vanadium (V), molybdenum (Mo), tantalum (Ta), niobium (Nb), chromium (Cr), tungsten (W), iron (Fe), cobalt (Co), nickel (Ni), lanthanum (La), magnesium (Mg), uranium (U), etc. Some inventive concepts include methods to prepare metal boride aerogels, for example, but not limited to, hafnium boride ($HfB_2$), zirconium boride ($ZrB_2$), titanium boride ($TiB_2$) aerogels, etc.

In some approaches, the synthesis of low-density metal boride aerogels (e.g., $HfB_2$ aerogel, $ZrB_2$ aerogel, etc.) with submicron grains includes a borothermal reduction of a boron-loaded metal oxide (B @$MO_2$) precursor aerogel. Forming a three-dimensional structure of a B @$MO_2$ precursor gel may be critical for producing a monolithic metal boride ($MB_2$) aerogel. In one approach, the assembly of the B @$MO_2$ precursor gel includes a homogeneous distribution of boron nanoparticles and metal oxide at a fine scale such that the structural integrity of a 3D aerogel structure can be maintained through the drying and borothermal reduction processes. A sol-gel synthesis includes reactants that form colloidal solution, a "sol," that ultimately forms a continuous gel-like diphasic network, a "gel," containing both a liquid phase and a solid phase. The sol-gel synthesis technique as described herein may intimately mix the two components boron nanoparticles and metal oxide at a relatively small scale (e.g., at a nanometer scale) by creating a suspension of boron nanoparticles in a metal oxide precursor solution, thereby resulting in a homogeneous distribution of interconnected metal oxide-coated boron nanoparticles. In various approaches, the versatile nature of sol-gel synthesis and the reduction process may allow for the production of a wide variety of metal borides in low-density forms similar to the results as described herein. In one approach, the sol-gel synthesis process described herein may allow for production of metal carbides in low-density forms.

FIG. 1 depicts a method 100 for forming a metal boride aerogel, in accordance with one inventive concept. As an option, the present method 100 may be implemented to construct structures such as those shown in the other FIGS. and/or described herein. Of course, however, this method 100 and others presented herein may be used to form structures for a wide variety of devices and/or purposes which may or may not be related to the illustrative inventive concepts listed herein. Further, the methods presented herein may be carried out in any desired environment. Moreover, more or less steps than those shown in FIG. 1 may be included in method 100, according to various inventive concepts. It should also be noted that any of the aforementioned features may be used in any of the inventive concepts described in accordance with the various methods.

Step 102 of method 100 includes dispersing boron nanoparticles in a solution of metal salt. In various approaches, dispersing boron nanoparticles in solution may include methods such as suspending, mixing, etc. In some approaches, boron nanoparticles may be dispersed in a solution with metal alkoxide used as a source. In other approaches, boron nanoparticles may be dispersed in a solution with metal salt precursors used as a source. In various inventive concepts, the choice of metal salt corresponds to the desired boride aerogel. For example, a hafnium salt used in step 102 would result in a hafnium boride, a zirconium salt used in step 102 would result in a zirconium boride, a magnesium salt used in step 102 would result in a magnesium boride, etc. Metal salts used in step 102 to form a metal boride aerogel may include metal salts of hafnium, zirconium, titanium, vanadium, niobium, tantalum, chromium, molybdenum, tungsten, iron, cobalt, nickel, lanthanum, germanium, yttrium, manganese, magnesium, etc. and combinations thereof. In some approaches, metal chlorides may be a source of metal (M) for the formation of boron-loaded metal oxide precursor gel, and thus metal chlorides may be used for suspension of boron nanoparticles in step 102. In other approaches, metal nitrides may be used for suspension of boron nanoparticles of step 102. In yet other approaches, alkoxides may be used for suspension of boron nanoparticles of step 102.

In some approaches, boron nanoparticles may be dispersed in a mixture of different metal salts.

In addition, in some approaches, some precursors oxides or borides (e.g., $MgB_2$) have melting temperatures less than an optimal processing temperatures, the target material would be supported on a high-temperature aerogel scaffold (e.g. carbon aerogel, graphene aerogel, etc.). The dispersed boron nanoparticles in the metal salt solution would then be infiltrated into the high-temperature aerogel scaffold prior to gelation.

Boron nanoparticles may be formed from a variety of boron sources, for example, boron carbide. In some approaches, boron nanoparticles may be obtained commercially. In one approach, the size of particles in a formed metal boride aerogel may be defined by the size of the boron nanoparticles of step 102. In some approaches, minimizing the initial nanoparticle size of the source material may result in smaller particle sizes in the final aerogel. In some approaches, an average diameter of the boron nanoparticles may be in a range of greater than zero and less than ten microns (μm). In some approaches, an average diameter of the boron nanoparticles may be in a nanoscale range where a nanoscale range is defined as less than 1000 nanometers (nm). In some approaches, an average diameter of the boron nanoparticles may be in a range of greater than zero and less than 100 nanometers. In preferred approaches, boron nanoparticles may have an average diameter in the range of less than 50 nm, and ideally, about 20 to about 30 nm. An average diameter of the boron nanoparticles may be in a range of greater than 5 nm to less than 50 nm but may be smaller or larger.

In some approaches, the boron nanoparticles may include boron carbide nanoparticles.

The coarseness of the metal boride aerogel may be tuned by the ratio of boron nanoparticles to metal salt in the suspension formed in step 102. For example, a ratio of boron nanoparticles to metal molecules may be reduced from a ratio of 10:1 to 3:1 thereby reducing the number of boron nanoparticles in the metal salt. A decrease in boron nanoparticles relies on an increased movement of atoms of the boron nanoparticle/metal salt to meet and react to form the boride. Thus, due to an increased diffusion or the reactants' atoms the formed aerogel may subsequently exhibit more grain coarseness, similar to sintering phenomena.

In some approaches, the solution may include a solvent that disperses boron nanoparticles in suspension and dissolves a metal salt. Moreover, the solution may include a solvent that is typically used in a gelation step of sol-gel method of synthesis of the metal oxide aerogels. In some approaches, the solution may include a solvent that includes boron nanoparticles and metal oxide, for example, the solvent may be ethanolic, aqueous, polar, nonpolar, etc.

The method 100 includes a step 104 of forming a boron-loaded metal oxide precursor gel using the dispersed boron nanoparticles in the solution of the metal salt. As included herein, B @$MO_2$ is an abbreviation of boron-loaded metal oxide, where B @ represents boron-loaded, M represents metal, and $O_2$ represent oxide. In various approaches, step 104 occurs at an ambient temperature, e.g., at room temperature. In some approaches, gelation of the boron nanoparticles dispersed in metal salt causes the formation of a boron-loaded metal oxide precursor gel. In some approaches, forming a boron-loaded metal oxide (B @ $MO_2$) precursor gel may include forming a 3D structure comprised of B @ $MO_2$ precursor gel.

In some approaches, after a boron-loaded metal oxide (B @$MO_2$) precursor gel is formed on the high-temperature aerogel scaffold, it may be processed at a temperature for conversion to a boride.

In some approaches, step 104 may involve conventional sol-gel methods known by one skilled in the art in the formation of aerogels. In one approach, step 104 may include epoxide-assisted sol-gel processes, e.g. solgelation. In preferred approaches, step 104 may involve the addition of epoxides, for example, propylene oxide, trimethylene oxide, dimethylene oxide, ethylene oxide, etc.

In one approach, the formation of a boron-loaded metal oxide precursor gel in step 104 with uniform distribution of boron nanoparticles in the gel may occur in a period of time that depends on the stability of the boron nanoparticle solution. In some approaches, formation of a boron-loaded metal oxide precursor gel in step 104 with uniform distribution of boron nanoparticles in the gel may occur in a period of time that may be greater than 0 minutes to less than about 10 minutes. In preferred approaches, formation of a boron-loaded metal oxide precursor gel may occur in less than 5 minutes if the boron nanoparticle suspension is less stable and the nanoparticles tend to settle quickly out of suspension. In other approaches, formation of a boron-loaded metal oxide precursor gel may occur in a period of time ranges on the order of greater than 10 minutes to hours if the boron nanoparticle suspension is stable and if the boron nanoparticles are slow to settle out of suspension. By way of example, but not intended to be limiting in any way, a homogenous distribution may be achieved by finely dispersing boron nanoparticles (~30 nm in diameter) in an ethanolic sol-gel solution that sets up in a short duration of time, for example, less than 5 minutes. A fast gel time may maintain a homogenous distribution of boron in the metal oxide gel.

In one approach, the boron-loaded metal oxide precursor gel may contain boron nanoparticles finely dispersed in a metal oxide gel in an appropriate stoichiometric ratio for a borothermal reduction of step 108. The boron-loaded metal oxide (B @$MO_2$) precursor gel may be assembled with a homogenous distribution of both components, the boron nanoparticles and metal oxide, at a fine scale such that the 3D gel structure can be maintained through the drying (step 106) and boron thermal reduction (step 108) processes. In some approaches, the boron-loaded metal oxide precursor gel includes the physical mixture of the boron nanoparticles with the metal oxides such that the boron nanoparticles may be chemically coated with metal oxide. Moreover, in some approaches, step 104 of forming a boron-loaded metal oxide precursor gel may allow the metal oxide macromolecules to both coat and connect the boron nanoparticles thereby providing intimate mixing of the boron and metal oxide at the smallest scale and forming tunable particles of the resulting metal boride aerogel.

In some inventive concepts, the boron-loaded metal oxide precursor gel may be formed with a mixture of metal oxides.

In one approach, the density of the precursor gels formed in step 104 may be tuned by modifying the reagent concentrations of the suspension of boron nanoparticles in a solution of metal salt of step 102. Furthermore, in some approaches, the density of the final metal boride aerogels may be tuned to ultralow densities by modifying the reagent concentrations of the suspension of boron nanoparticles in a solution of metal salt. By way of example, but not limiting in any way, in some approaches, small sized boron nanoparticles may aid in making a stable suspension and minimizing the particle size of the final metal boride aerogel thereby resulting in an ultralow density of the aerogel. Moreover, the growth size of the particles of the aerogel may be particularly selected by the particle size of the boron nanoparticles.

Step 106 of method 100 involves drying the boron-loaded metal oxide precursor gel formed in step 104. In some approaches, the drying conditions of step 106 may be tuned to form an aerogel or a xerogel from the B @$MO_2$ precursor gel.

In one approach of step 106, the boron-loaded metal oxide precursor gel may be dried following a method of supercritical drying using techniques known in the art thereby resulting in a boron-loaded metal oxide aerogel. In some approaches, a method of supercritical drying using carbon dioxide ($CO_2$) is generally understood by one skilled in the art, the method including a solvent exchange (e.g. acetone, ethanol, etc.) with liquid $CO_2$ followed by high pressure and a relative temperature, e.g., the critical point for $CO_2$ being about 1100 psi at about 31° C., for a supercritical regime. Then, maintaining the temperature, the pressure may be reduced to transform the supercritical $CO_2$ into a gas thereby forming an aerogel.

Following supercritical drying of the boron-loaded metal oxide precursor gel, the 3D structure may demonstrate minimal shrinkage, for example drying the boron-loaded metal oxide precursor gel may result in shrinking the structure to a size having an average diameter in a range of greater than 0% and less than 5% of an average diameter of the structure before drying.

In another approach of step 106, the boron-loaded metal oxide precursor gel may be dried by an evaporation process under ambient conditions at room temperature (e.g., in a range of 20° C. to 25° C., at ambient pressure) thereby resulting in a boron-loaded metal oxide xerogel. Briefly, the boron-loaded metal oxide precursor gel following a solvent exchange (e.g. acetone, ethanol, etc.), may be air dried at room temperature until liquid has evaporated. The xerogel may be denser, harder, more mechanically robust, etc. than the aerogel formed by supercritical drying of a similar boron-loaded metal oxide precursor aerogel.

Step 108 of method 100 includes heating the dried boron-loaded metal oxide precursor gel to form a metal boride aerogel, where the metal boride aerogel is essentially free of the metal oxide. In one approach, step 108 involves forming a metal boride aerogel by thermal annealing the boron-loaded metal oxide gel that had been dried by supercritical drying. In another approach, step 108 involves forming a metal boride aerogel by thermal annealing the boron-loaded metal oxide xerogel that had been dried by ambient drying methods. In various approaches, boron-loaded metal oxide gels or boron-loaded metal oxide xerogels may be converted to metal boride aerogels having primary particles having an average diameter less than 100 nm by methods of thermal annealing.

Step 108 may include heating a boron-loaded metal oxide aerogel to high temperatures sufficient to cause, induce, initiate, etc. a borothermal reduction reaction. In some approaches, the high temperature to cause the borothermal reduction reaction may be in an inert gas. Equation 1 describes a borothermal (B, boron) reduction of a metal (M) oxide ($O_2$):

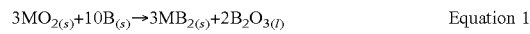   Equation 1

In some approaches, M represents Hf, Zr, etc. The borothermal reduction reaction as shown in Equation 1 may proceed at temperatures that depend on the reducing temperature of the metal oxide, for example, the temperatures may be range from about 600° C. to about 1400° C.

Step 108 of method 100 may include heating to a second temperature sufficient to effect a thermal annealing reaction. As shown in Equation 2, a subsequent anneal at a temperature in a range of about 1400° C. to about 2000° C. is employed to vaporize the byproduct of boron oxide ($B_2O_3$ with a melting point of 450° C.), such that the $B_2O_3$ becomes a gas and thus may be removed from the metal boride aerogel.

   Equation 2

In some approaches, step 108 involves heating a boron-loaded metal oxide xerogel to an effective temperature to induce thermal annealing following a borothermal reduction reaction.

In various inventive concepts, the boron-loaded metal oxide structure, in which the structure may be an aerogel, a xerogel, etc., may be robust to maintain structural integrity while undergoing transformation during the high temperatures and molecular rearrangement of the solid state reaction that includes the borothermal reduction reaction (Equation 1) and the vaporization step of boron oxide (Equation 2).

In some inventive concepts, the metal boride aerogel formed in step 108 is substantially a single phase aerogel. For example, the metal boride aerogel includes substantially metal boride, and may be essentially free of metal oxides, boron oxide, metal, boron metal, etc. For the purposes of this description, essentially free may be defined as including less than 2 at % of the material (e.g. metal oxides, boron oxide, metal, boron metal, etc.).

The following description describes various inventive concepts with reference to figures. Note that the figures are not drawn to scale, but rather features may have been exaggerated to help exemplify the descriptions herein.

Figure 2A:
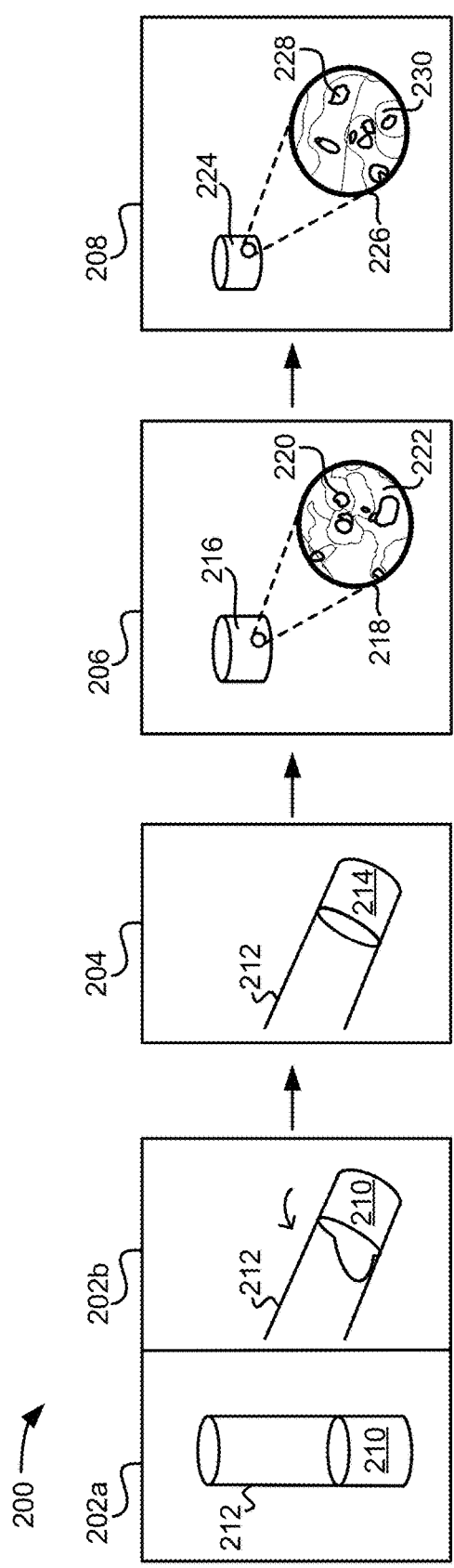
FIG. 2A is a schematic drawing of steps of a method to form a metal boride aerogel, according to one inventive concept.
Figure 2B:
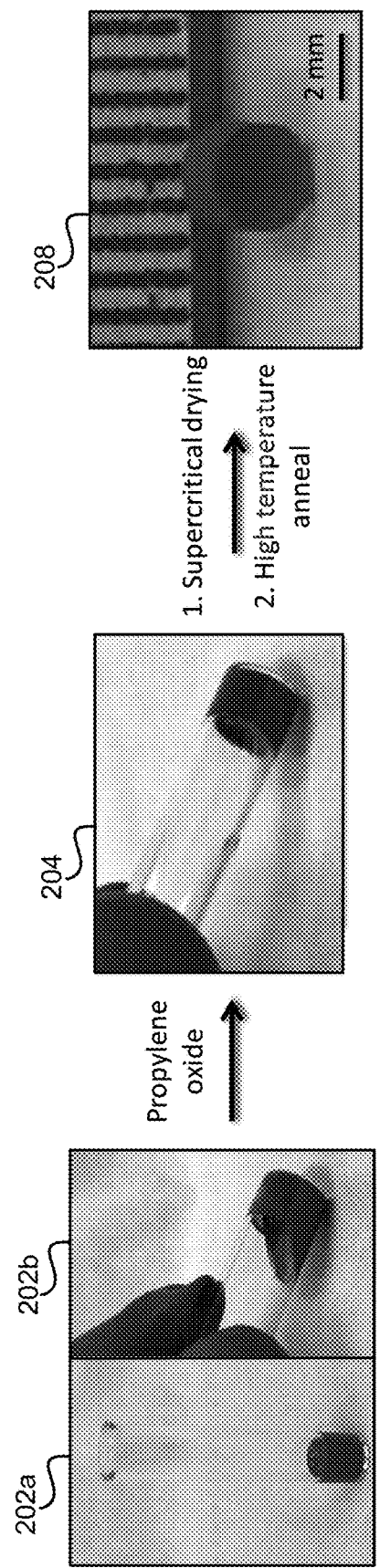
FIG. 2B is a series of images of a method to form a metal boride aerogel, according one inventive concept.

FIGS. 2A-2B depict a method 200 for forming a metal boride aerogel, in accordance with one inventive concept. As an option, the present method 200 may be implemented to construct structures such as those shown in the other FIGS. described herein. Of course, however, this method 200 and others presented herein may be used to form structures for a wide variety of devices and/or purposes which may or may not be related to the illustrative inventive concepts listed herein. Further, the methods presented herein may be carried out in any desired environment. Moreover, more or less steps than those shown in FIGS. 2A-2B may be included in method 200, according to various inventive concepts. It should also be noted that any of the aforementioned features may be used in any of the inventive concepts described in accordance with the various methods.

FIG. 2A graphically depicts steps in a method 200 to form a metal boride aerogel, according to one inventive concept. As shown in step 202a of FIG. 2A, the method 200, in one inventive concept, begins with a suspension 210 of boron nanoparticles in a solution of metal salt in a container 212. When the container 212 is tilted in the direction of the arrow in optional step 202b, the liquid, runny nature of the suspension 210 is evident.

FIG. 2B is a series of digital images of steps as shown in the graphic representation of method 200 of FIG. 2A, according to one inventive concept. The images of the first step 202a, 202b show the liquid, runny nature of the suspension when the container is tilted. Moreover, the boron liquid suspension has a brownish hue of the boron which contrasts with white or clear gel typically produced in methods with pure metal oxide.

According to one approach as illustrated in FIG. 2A, step 204 involves the formation of a boron-loaded metal oxide precursor gel 214 from the suspension 210 of boron nanoparticles in a solution of metal salt of steps 202a, 202b. The digital image of step 204 shown in FIG. 2B shows that the addition of propylene oxide causes the suspension of boron nanoparticles in metal salt solution to form a wet boron-loaded metal oxide gel where the liquid may be set and does not flow.

Step 206 involves the formation of a boron-loaded metal oxide aerogel 216 by supercritical drying of the precursor gel 214 of step 204. A magnified view 218 of the boron-loaded metal oxide aerogel 216 graphically depicts the metal oxide macromolecules 222 coating and connecting the boron nanoparticles 220 within the aerogel 216 structure.

Step 208 of FIG. 2A involves the two step heating process that includes a borothermal reaction to form the metal boride followed by a thermal annealing step to remove the boron oxide from the metal boride aerogel 224. A magnified view 226 of the metal boride aerogel 224 graphically depicts the metal boride particles 230 of the aerogel 224 with the boride nanoparticle centers 228.

In some inventive concepts, the two staged heat treatment of step 208 takes place in an inert gas. In some approaches, the inert gas may be helium, argon, neon, xenon, etc. In some approaches, at high temperatures (e.g., greater than 600° C.) the gas may be nitrogen ($N_2$) and may result in the formation of metal nitride and/or boron nitride.

A digital photo of a metal boride aerogel is shown in step 208 of FIG. 2B. In one approach, the metal boride aerogels may have features, protrusions, filaments, particles, etc. up to 10 μm. In one approach, a metal boride aerogel may be sandwiched between layers of a fully dense material. In one approach, the fully dense material adjacent to the metal boride aerogel may be a laminate, layer, etc.

In some inventive concepts, a metal boride aerogel may be formed as a 3D structure of metal boride particles. In various inventive concepts, a metal boride aerogel may be formed with a density that has been tailored by modifying the materials in the precursor boron-loaded metal oxide (B @$MO_2$) structure and/or modifying the drying conditions. In some approaches, the metal boride aerogel includes metal boride particles such as hafnium boride, zirconium boride, titanium boride, or a combination thereof. In some approaches, the metal boride particles of the metal boride aerogel may have the same composition. In other approaches, the metal boride particles of the metal boride aerogel may have different compositions.

In some approaches, the metal boride aerogel is a 3D structure including at least one of the following metals: hafnium, zirconium, titanium, vanadium, molybdenum, tantalum, niobium, chromium, tungsten, iron, cobalt, nickel, lanthanum, uranium, magnesium, or a combination thereof.

In some approaches, a high surface area of the metal boride aerogel may indicate smaller particle size. In some approaches, the surface area of a metal boride aerogel may be in a range of about 10 $m^2$/g to about 500 $m^2$/g. In some approaches, the density of a metal boride aerogel may be in the range of about 50 mg/$cm^3$ to about 1,000 mg/$cm^3$. By way of example, but not limiting in any way, the densities of metal boride aerogels may be as low as about 3% and 7% of the full density $HfB_2$ and $ZrB_2$, respectively, and the surface areas of the $HfB_2$ and $ZrB_2$ aerogels may be as much as 100 and 200 $m^2$/g, respectively.

In one inventive concept, a metal boride aerogel may be formed using a supercritical drying step to form a precursor B @$MO_2$ aerogel with porosities in the range of about 90% to about 96%.

In one inventive concept, a metal boride aerogel may be formed using an ambient drying step to form a precursor B @$MO_2$ xerogel having about a 50% porosity.

In one inventive concept, the metal boride aerogel may be electrically insulating. In some approaches, the metal boride aerogel may have low electrical conductivity, where the electrical conductivity may be in a range of about 1 S/cm or less.

According to one inventive concept, a density of the metal boride aerogel may be in a range of about 100 mg/$cm^3$ to about 9000 mg/$cm^3$. A theoretical maximum density can be calculated from the density of the metal boride aerogels and the density of a fully dense metal boride. In some approaches, a range of percent theoretical maximum density of metal boride aerogels may be in a range of about 1 to about 90% but may be higher or lower.

In some approaches, there may be a significant reduction in thermal conductivity between the aerogel and bulk forms. In one approach as described herein, metal boride aerogels and xerogels may have a thermal conductivity about two orders of magnitude (e.g., 300 times) less than a thermal conductivity of fully dense metal boride material. Without wishing to be bound by any theory, this dramatic drop tends to be typical of aerogel structures with ultrafine grains and porosity and has been demonstrated with other conductive materials, such as carbon. As would be generally understood by one skilled in the art, thermal conductivity is a strong function of density. For reference, silica, a traditional aerogel material, experiences a 100 times reduction in thermal conductivity between dense and aerogel forms compared to 300 times for $ZrB_2$.

In some approaches, a thermal conductivity of the metal boride aerogel is minimal and may only be in a range of about 1 W/(m K) to about 10 W/(m K). In one approach, the low thermal conductivity of the metal boride aerogel is preferable for application of the metal boride aerogel as an insulator.

Figure 6:
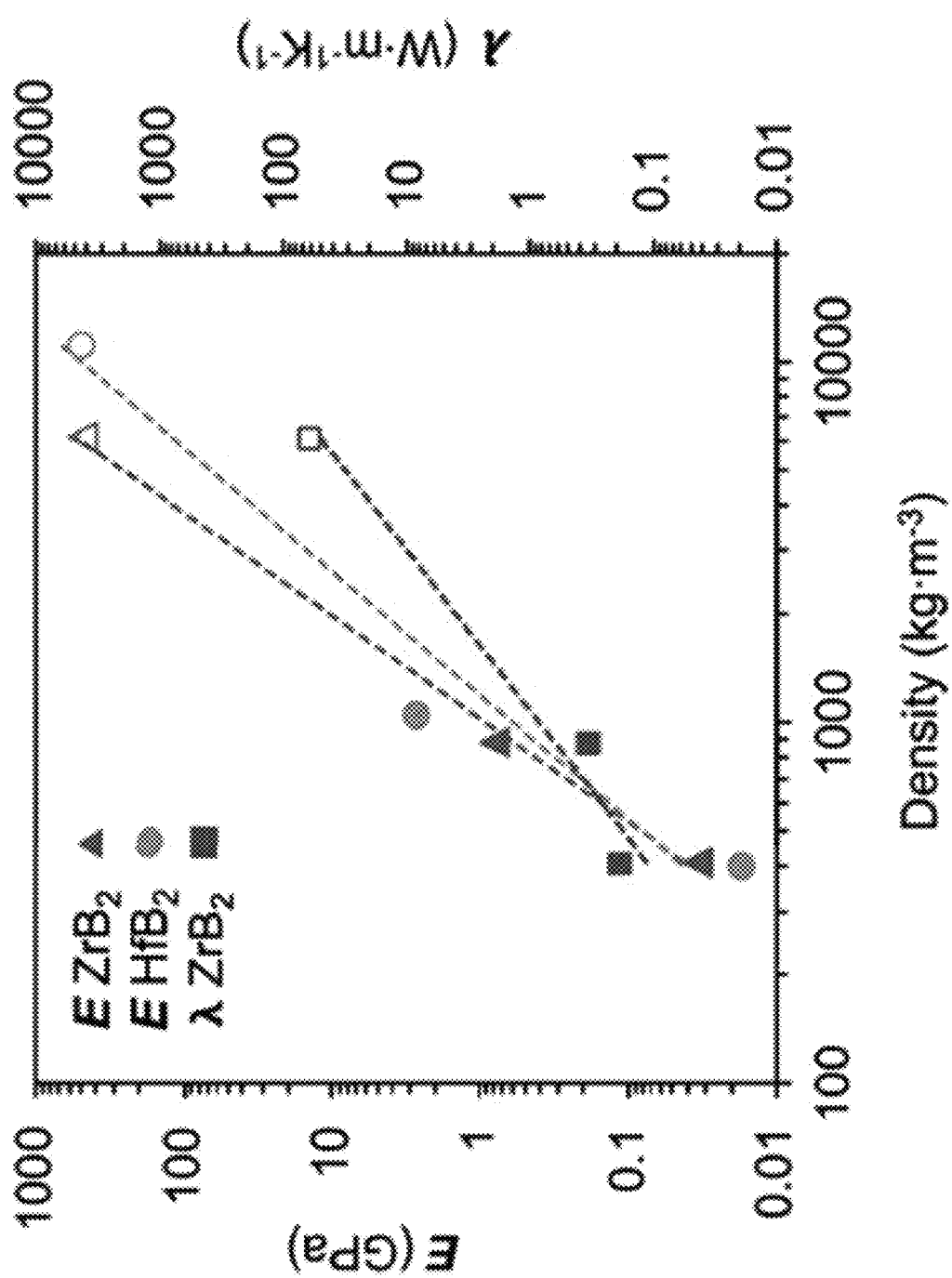
FIG. 6 is a plot of Young's modulus and thermal conductivity relative to density of $ZrB_2$ and $HfB_2$ aerogels and xerogels, according to some aspects of an inventive concept.

As shown, by example only in FIG. 6 and not meant to be limiting in any way, aerogels as described herein have a super-linear dependence which may allow the aerogels to perform well as thermal insulators. Due to the lower hardness and Young's modulus values of the UHTC aerogels and xerogels as described herein, the final application for these thermal insulators may include a dense skin to protect and structurally support the ultralow-density, similar to a space shuttle tile.

A Young's modulus provides a measurement of the force applied to a metal boride aerogel before the strain is imposed causing the metal boride aerogel to change shape. In some approaches, the Young's modulus for metal boride aerogels may be in a range of about 0.02 Gigapascal (GPa) to about 200 GPa.

The hardness of a metal boride aerogel may be measured by indentation with a diamond shaped tip and the force applied to generate an impression from the tip. In one approach, a hardness of the metal boride aerogel may be in a range of about 0.5 to about 20 Megapascal (MPa). In various approaches, tuning the density of the metal boride aerogel in turn may affect properties of the metal boride aerogel, for example, thermal conductivity, the Young's modulus, the hardness, etc. For example, in one approach, tuning a metal boride aerogel to have a very low density may likely provide the desirable property of a very low thermal conductivity. In another approach, a metal boride aerogel may be tuned for several properties, for example, low thermal conductivity with desired mechanical properties Young's modulus and hardness.

In further approaches, the metal boride aerogel may be electrically conductive, e.g., where the electrical conductivity may be in a range of greater than about 1 S/cm.

In one inventive concept, the metal boride aerogel may be thermally resistant as defined as resistance to sintering. The thermal resistance of a metal boride aerogel may depend on the melting temperature of the metal boride. In some approaches, a melting temperature of the metal boride of the metal boride aerogel may be in a range of greater than 1000° C. to less than about 3500° C. In some approaches, metal boride material of the aerogel may have melting temperatures over 3000° C. In other approaches, metal boride material of the aerogel may have melting temperatures over 2000° C. In yet other approaches, metal boride material of the aerogel may have melting temperatures over 1000° C.

High-temperature sintering (e.g., above 2000° C.) could be used to increase the strength of aerogels described herein. However, preferably, aerogels have low thermal conductivity, thus the high-temperature sintering may in turn adversely affect the aerogel by increasing conductivity from particle coarsening. For example, in some approaches, sintering may increase the conductivity of the material by increasing the density and/or increasing solid network conductivity. In preferred approaches, the sintering process may be tuned to strengthen the aerogel without adversely affecting the thermal conductivity of the material, e.g., minimizing particle coarsening.

The composition of the aerogels may be confirmed by energy dispersive spectroscopy, Raman spectroscopy, x-ray diffraction, and x-ray photoelectron spectroscopy.

Moreover, in some inventive concepts, the 3D structure of the metal boride aerogel has metal boride particles having an average diameter less than 1 μm. In some approaches, the particle size of the metal boride aerogels may have an average diameter in the nanoscale range, where the nanoscale range is less than about 1000 nm. In some approaches, the metal boride particles of the metal boride aerogel have an average diameter of less than about 100 nm. For example, the particle size of the $ZrB_2$ and $HfB_2$ aerogels may have an average diameter less than about 100 nm.

In some approaches, the borothermal reaction (involving direct heating with helium) may cause an increased coarseness of the particles in the boron-loaded metal oxide gels. By way of example, but not intended to be limiting in any way, a borothermal reaction of boron-loaded titanium oxide (B @$TiO_2$) precursor aerogels may cause a coarsening of $TiB_2$ particles. Specifically, an average diameter of the $TiB_2$ particles of $TiB_2$ aerogels may be in a range of about 200 nm to about 400 nm. In contrast, in other approaches, a borothermal reduction of other boron-loaded metal oxide precursor aerogels (e.g., B @$ZrO_2$ gel and B @$HfO_2$ precursor aerogel under the same conditions as B @$TiO_2$ precursor aerogel) may not result in a coarsening of particles (e.g. $ZrB_2$ and $HfB_2$ particles may have an average diameter less than about 100 nm). In some approaches, an increased coarsening of the metal boride particles may provide increased strength and higher density in the metal boride aerogel.

In some approaches, the metal boride aerogel may have additional components. In some approaches, the metal boride aerogel may have at least in part a composition of a hybrid $MB_x$/carbon aerogel, in which x may be a number greater than 0 and less 10, where M represent a metal and B represents boride. In other approaches, a metal boride aerogel may have at least in part a composition of a $MB_xC_yO_z$ aerogel, in which y may be a number greater than 0 and less 10, and z may be a number greater than or equal to 0 and less than 10.

In some inventive concepts, metal hybrid aerogels may exhibit unique properties, for example, $MgB_2$/carbon aerogels exhibit superconductivity.

In some inventive concepts, the metal boride aerogels may be useful in a sandwich-type structure with the metal boride aerogel positioned between two dense skin-like layers thereby reducing the transport of heat from the outer layers to the inner metal boride aerogel layer. In some approaches, the metal boride aerogel may be positioned between two dense skin-like layers of metal. In other approaches, the metal boride aerogel may be positioned between two dense skin-like layers of dense metal boride. In yet other approaches, the metal boride aerogel may be positioned between two dense skin-like layers of other ceramic material. These approaches are provided as examples and are not meant to be limiting in any way.

Figure 8:
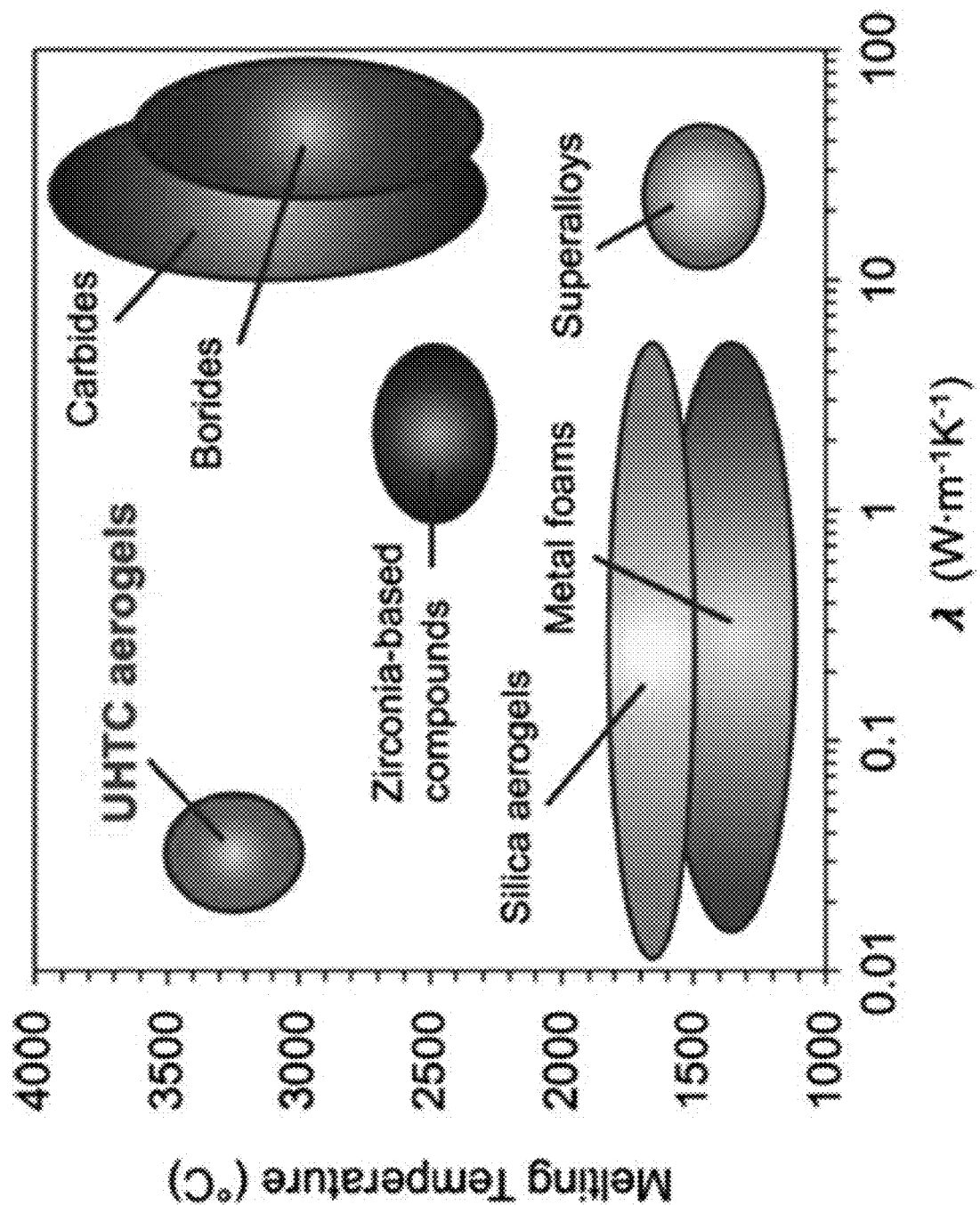
FIG. 8 is a plot of an Ashby-type diagram comparing materials in terms of melting temperature of the material (y-axis) versus thermal conductivity (x-axis).

Without wishing to be bound by any theory, it is believed that a sol-gel synthesis process as described herein provides a flexibility such that UHTC material may be made with tunable densities and compositions to best match the thermal and mechanical specifications of a final design. The aerogels described herein include a novel combination of having a high melting temperature and ultralow thermal conductivity. For example, FIG. 8 represents an Ashby-type diagram to illustrate how the UHTC aerogels as described herein stand apart from other material candidates high temperature applications.

By adjusting precursor chemistry and taking advantage of the borothermal reduction process, the realm of aerogels can be extended to UHTC materials. B @$MO_2$ gel monoliths may be produced from epoxide-initiated gelation of ethanolic solutions of metal salts with suspended boron nanoparticles. These aerogel precursors may be transformed into-density, highly porous metal boride aerogels via a borothermal reduction of the metal oxide.

XRD analysis confirms the presence of the $MB_2$ phase and an absence of unreacted boron, boron oxide, metal oxide, etc. In some approaches, and not meant to be limiting in any way, a relative density of $HfB_2$ and $ZrB_2$ aerogels may include 3% and 7%, respectively, with constituent particles less than 100 nm in size. Further, in some approaches, metal boride aerogels exhibit a surface area of greater than 10 $m^2$/g and thermal conductivities as low as 0.184 W/(m K). The relative density of the boride aerogels can be tailored by adjusting reagent concentrations and the drying conditions, and due to the flexibility of the sol-gel chemistry and abundance of metal salts, the synthesis process as described herein may easily be expanded to produce other metal boride and carbide aerogels.

Experimental Methods $ZrB_2$ and $HfB_2$ Aerogels

In a typical synthesis, a preparation of the ethanolic boron nanoparticle suspension was accomplished by dispersing 5 wt % 30 nm boron nanoparticles (Specialty Material, Inc., Lowell, Mass.) in 200 proof ethanolic via tip sonication (1 min, 50% power, pulsed 3 sec on, 3 sec off) and planetary mixer (1 min, 2000 rpm).

Boron-loaded metal oxide (B @$MO_2$) precursor gels were prepared by combining a boron nanoparticle suspension with deionized water and the corresponding metal chloride ($MCl_x$) at a molar ratio of 34:1 $H_2O/MCl_x$, boron (B) at a molar ratio of 10:1 $B/MCl_x$, and propylene oxide (PO) at a molar ratio of 9:1 $PO/MCl_x$.

For the boron-loaded hafnia (B @$HfO_2$), precursor for the $HfB_2$, 1.3 mmol hafnium tetrachloride (Sigma-Aldrich, 98%, St. Louis, Mo.) was dissolved in 3.57 g of the ethanolic boron nanoparticle suspension and 1 g deionized water. This suspension was chilled to 0° C. before adding 1.132 ml propylene oxide while stirring. Gelation occurred in a matter of minutes.

For the boron-loaded zirconium oxide (B @$ZrO_2$), precursor for the zirconium boride ($ZrB_2$), 1.3 mmol zirconium tetrachloride (Sigma-Aldrich, 99.9%, St. Louis, Mo.) was dissolved in 3.57 g of the ethanolic boron nanoparticle suspension and 1 g deionized water. This suspension was chilled to 0° C. before adding 1.132 ml propylene oxide (Sigma-Aldrich, 99%, St. Louis, Mo.) while stirring. Gelation occurred in a matter of minutes.

For the boron-loaded titanium oxide (B @$TiO_2$), precursor for the titanium boride ($TiB_2$), 1 mmol titanium ethoxide was dissolved in 3.57 g of the ethanolic boron nanoparticle suspension and 71.4 µl concentrated hydrochloric acid (HCl). Next, 85.7 µl deionized water was added to the suspension. This suspension was chilled to 0° C. before adding 357 mg propylene oxide while stirring. Gelation occurred in a matter of minutes.

After gelation, the monolithic precursor gels were aged for 1-7 days, and then washed in acetone before drying. Drying of the gels was done via supercritical drying (for aerogels) or ambient drying (for xerogels). Little to no shrinkage was observed for supercritical drying. Moderate shrinkage was observed, up to 50%, when the gel was dried at an ambient temperature.

Borothermal reduction was performed in a graphite crucible in a graphite furnace (Thermal Technologies, LLC, Chatsworth, Calif.). Monolithic metal boride aerogels were prepared via a two-staged heat treatment in ultrahigh purity helium. The boron-metal oxide (B @$MO_2$) precursor aerogels (after drying) were first ramped at 2° C./min to 850° C., 1050° C., and 1150° C. for B @$TiO_2$, B @$ZrO_2$, and B @$HfO_2$, respectively, held for 2 hour, then ramped at 10° C./min to 1600° C. and held for 1 hour before cooling to room temperature.

Electron Microscopy.

Field-emission scanning electron microscopy (FE-SEM) and energy dispersive x-ray spectroscopy (EDS) analysis was performed on a JEOL 7401-F (Peabody, Mass., USA) at 5-10 keV (20 mA) in lower secondary electron imaging mode with a working distance of 2-8 mm.

For further analysis of samples, high resolution transmission electron microscopy (TEM) characterization was performed on a FEI TF-20 Tecnai electron microscope (Hillsboro, Oreg., USA) operated at 200 kV. TEM analysis of prepared samples was conducted at the National Center for Electron Microscopy, Lawrence Berkeley National Laboratory. Funding for TEM analysis was provided by the Air Force Office of Scientific Research under Award No. FA9550-14-1-0323.

Nitrogen Porosimetry.

Textural properties were determined by Brunauer-Emmett-Teller (BET) and Barrett-Joyner-Halenda (BJH) methods using an ASAP 2020 Surface Area Analyzer (Micromeritics Instrument Corporation, Norcross, Ga., USA) via nitrogen porosimetry. Samples of approximately 0.1 g were heated to 150° C. under vacuum ($10^{-5}$ Torr) for at least 24 hours to remove all adsorbed species.

X-ray Diffraction.

X-ray diffraction was also performed on the aerogel samples to confirm the successful reduction to the metal boride. X-ray diffraction (XRD) measurements were performed on a Bruker AXS D8 ADVANCE X-ray diffractometer (Madison, Wis., USA) equipped with a LynxEye 1-dimensional linear Si strip detector. The samples were scanned from 5 to 75° 2θ. The step scan parameters were 0.02° steps and 2 s counting time per step with a 0.499° divergence slit and a 0.499° antiscatter slit. The X-ray source was Ni-filtered Cu radiation from a sealed tube operated at 40 kV and 40 mA. Phases in the samples were identified by comparison of observed peaks to those in the International Centre for Diffraction Data (ICDD PDF2009) powder diffraction database, and also peaks listed in reference articles. Goniometer alignment was ensured using a Bruker-supplied $Al_2O_3$ standard.

Indentation

Indentation was performed using an MTS Nano Indenter XP (Surface Systems+Technology GmbH, Hueckelhoven, Germany) with a 50 µm spherical sapphire tip and a maximum load of 15 milli-Newton (mN), Young's modulus and hardness were extracted using the Oliver and Pharr method with a penetration depth of 5 µm.

Density.

Bulk densities of the samples were determined from the physical dimensions and mass of each sample.

Experimental Results

FIGS. 3A-3D show a detailed view by electron microscopy of the porous framework that constitutes the B @$MO_2$ precursor aerogels after supercritical drying. SEM images of boron nanoparticles (FIG. 3A) and B @$ZrO_2$ precursor aerogel (FIG. 3B) show that the primary particle size of the precursor aerogel may be similar to that of the boron nanoparticles (e.g. sub-100 nm). The SEM images of the boron nanoparticles (FIG. 3A) showed that the boron nanoparticles may determine the particle size of the resulting composite metal in the metal boride aerogel. Moreover, the network structure of the precursor aerogel closely resembles that of the boron nanopowder.

TEM images of a B @$ZrO_2$ precursor aerogel (FIG. 3C) and B @$HfO_2$ precursor aerogel confirmed that the primary particle network in the precursor aerogel included boron nanoparticles coated and cross-linked by the much finer $ZrO_2$ and $HfO_2$ nanoparticles. These results confirm that a homogenous, finely distributed mixture of boron and metal oxide was achieved in the precursor aerogel.

Figure 3A:
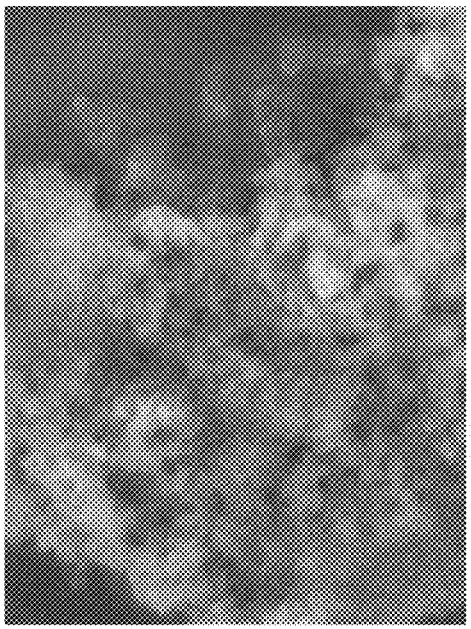
FIG. 3A is a SEM image of boron nanoparticles.
Figure 3B:
FIG. 3B is a SEM image of a B @$ZrO_2$ precursor aerogel.
Figure 3C:
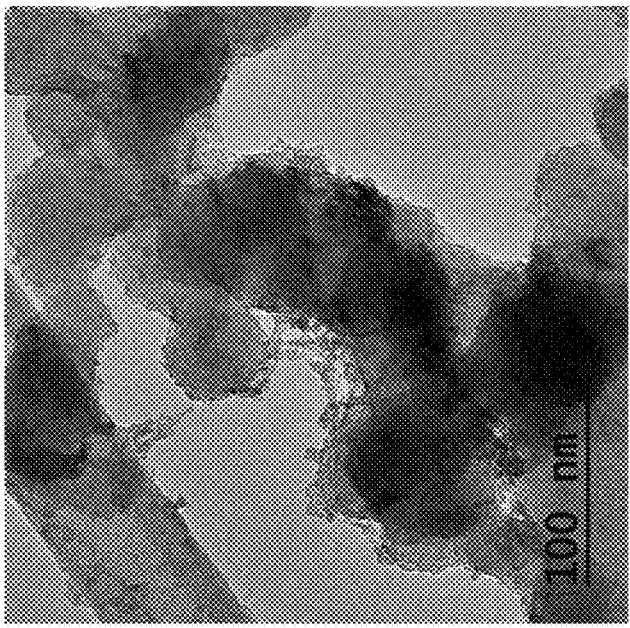
FIG. 3C is a TEM image of B @$ZrO_2$ precursor aerogel.
Figure 3D:
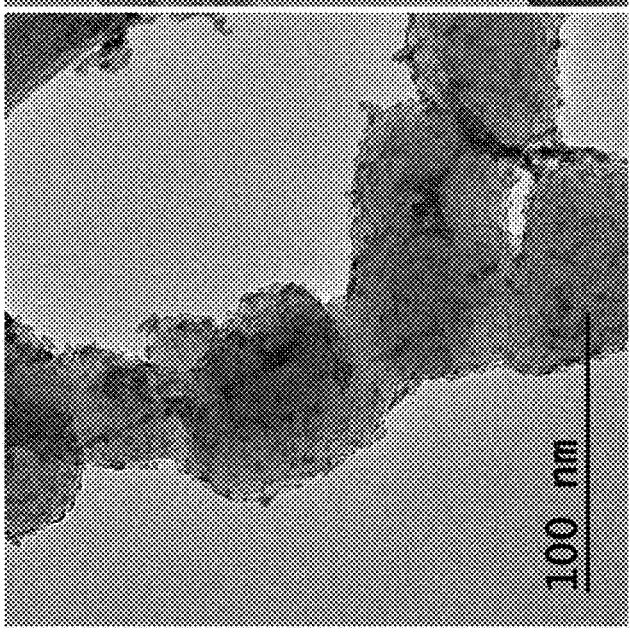
FIG. 3D is a TEM image of B @$HfO_2$ precursor aerogel.

In addition, as shown in FIG. 3B, SEM images of the B @$ZrO_2$ precursor aerogel (after supercritical drying) showed the expected porous network of nanoparticles. As the size of the metal oxide nanoparticles (FIG. 3B) appeared similar to that of the boron nanoparticles (FIG. 3A) it was difficult to distinguish one from the other in the SEM images. Moreover, it is likely that the boron nanoparticles may be coated with metal oxide during the sol-gel synthesis, which also makes them difficult to observe.

After firing the B @ZrO$_2$ and B @HfO$_2$ gels at 1050° C. and 1150° C., respectively, for two hours followed by a hold at 1600° C. for one hour, the monoliths changed color from brown to gray, and appeared to shrink uniformly (ca. 30-40% linear shrinkage), maintaining their original shape.

Table 1 (see below) lists physical, thermal, and mechanical properties of supercritically dried ZrB$_2$ and HfB$_2$ aerogels and ambient dried ZrB$_2$ and HfB$_2$ xerogels. The densities of the ZrB$_2$ and HfB$_2$ aerogels were 413 and 407 mg/cm$^3$, respectively. This represented porosities of 93 and 96% for the ZrB$_2$ and HfB$_2$ aerogels, respectively.

Figure 4:
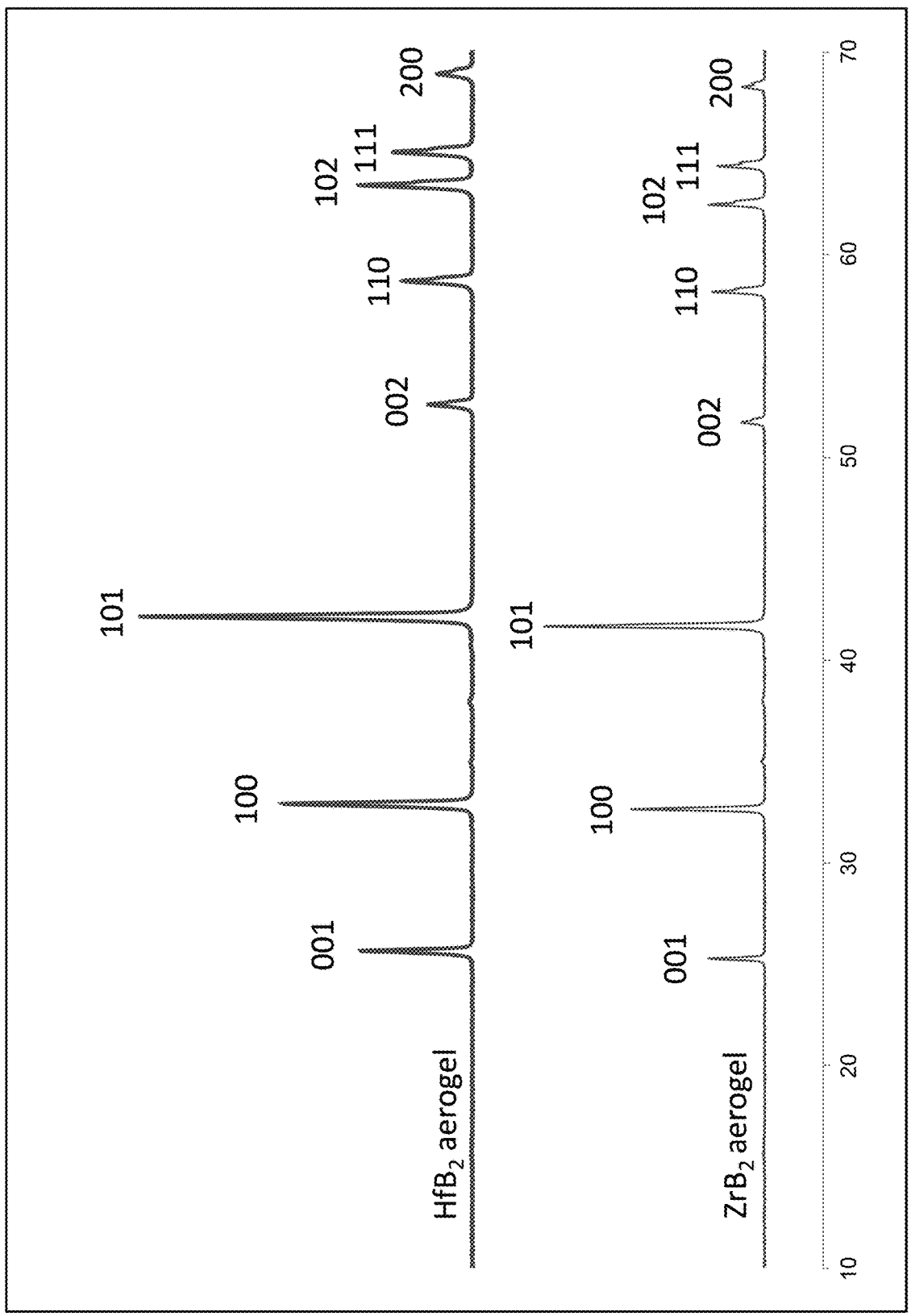
FIG. 4 is a plot of XRD spectra of an $HfB_2$ aerogel (top) and a $ZrB_2$ aerogel (bottom).

Confirmation of a complete borothermal reduction was determined by XRD (FIG. 4). The diffraction peaks observed in the spectra from the ZrB$_2$ aerogel (bottom spectra) and HfB$_2$ aerogel (top spectra) were consistent with a single phase aerogel, and as expected for bulk ZrB$_2$ (PDF 00-034-0423) and bulk HfB$_2$ (PDF 00-038-1398), respectively. Each of the reduced aerogels exhibited strong (001), (100), and (101)

was correlated with the primary particle size of the aerogel. In addition, the volume of gas adsorbed by the aerogels was measured using the BET formula. According to BET calculations, the surface areas of the ZrB$_2$ and HfB$_2$ aerogels, were 19 and 10 m$^2$/g, respectively and suggested average particles sizes of 50 and 52 nm for ZrB$_2$ and HfB$_2$ aerogels, respectively. These values were consistent with the sizes observed in SEM and TEM, as well as the crystallite sizes determined from XRD.

Energy dispersive spectroscopy (EDS) indicated the presence of boron in the aerogel matrix. After borothermal reduction, EDS showed a B:metal ratio of two, which was expected for metal borides.

SEM images revealed that the primary particle size of the metal boride aerogel increased compared to the precursor gel. While a significant fraction of particles remained less than 100 nm in the ZrB$_2$ and HfB$_2$ examples, some larger (100-200 nm) particles were also present. In contrast, the TiB$_2$ aerogel includes primarily of the particles in the 200-400 nm range.

Looking back to Table 1, at an ambient temperature, the thermal conductivities for ZrB$_2$ aerogels and xerogels were

TABLE 1

Physical, Thermal, and Mechanical Properties of ZrB$_2$ and HfB$_2$ Aerogels and Xerogels

| Sample | Density (mg/cm$^3$) | % Theoretical Max. Density | Thermal Conductivity (W/(m K)) | Young's Modulus (Gpa) | Hardness (MPa) |
|---|---|---|---|---|---|
| ZrB$_2$, xerogel | 881 ± 80 | 14.4 | 0.328 ± 0.010 | 0.81 ± 0.10 | 10.83 ± 0.65 |
| HfB$_2$, xerogel | 1058 ± 100 | 9.5 |  | 2.71 ± 0.59 | 15.39 ± 0.87 |
| ZrB$_2$, aerogel | 413 ± 40 | 6.7 | 0.184 ± 0.008 | 0.034 ± 0.0024 | 1.67 ± 0.17 |
| HfB$_2$, aerogel | 407 ± 40 | 3.6 |  | 0.017 ± 0.006 | 0.90 ± 0.11 | diffraction peaks that can be indexed to the hexagonal lattice structure of the relevant metal boride. There were no peaks for hafnium, boron metal, hafnium oxide, or boron oxide in the HfB$_2$ aerogel sample (top spectra). There were no peaks for zirconium, boron metal, zirconium oxide, or boron oxide in the ZrB$_2$ aerogel sample (bottom spectra). Thus, no oxide or metal impurities were present in the aerogels.

Analysis of the peaks using the Scherrer equation indicated that average crystallite sizes were calculated to be approximately 43 and 37 nm for ZrB$_2$, and HfB$_2$ aerogels, respectively. Therefore, based on the XRD data, full reduction of the B @ZrO$_2$ and B @HfO$_2$ precursor aerogels was achieved to create aerogels that includes ZrB$_2$ and HfB$_2$ nanoparticles, respectively.

Figure 5A:
FIG. 5A is a SEM image of a $ZrB_2$ aerogel.
Figure 5B:
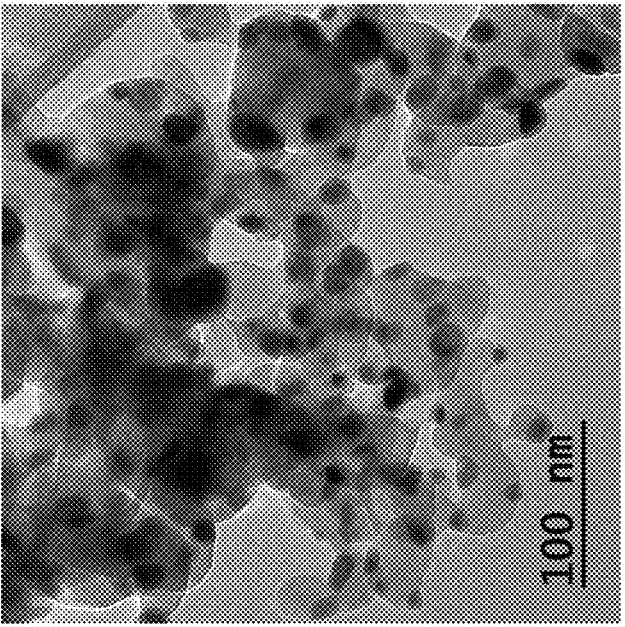
FIG. 5B is a TEM image of a $ZrB_2$ aerogel.
Figure 5C:
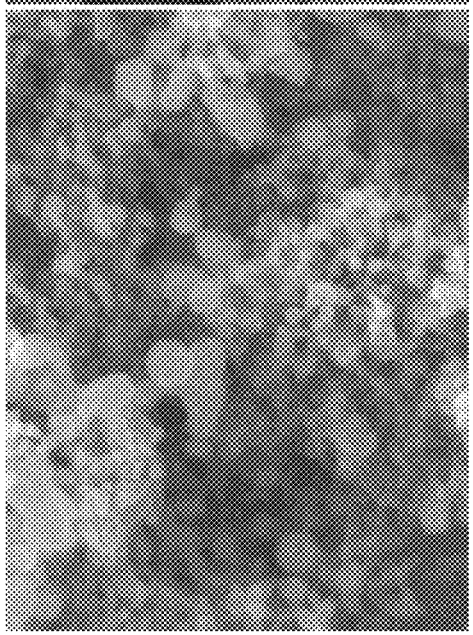
FIG. 5C is a SEM image of a $HfB_2$ aerogel.

Electron microscopy was performed on the ZrB$_2$ and HfB$_2$ aerogels to characterize pore morphology after borothermal reduction. Scanning electron microscopy (SEM) images of a ZrB$_2$ aerogel (FIG. 5A) and HfB$_2$ aerogel (FIG. 5C) suggested that the distribution of primary particle sizes of the ZrB$_2$ and HfB$_2$ aerogels, respectively, had widened compared to the precursor gel (for example, see SEM image of precursor aerogel B @ZrO$_2$, FIG. 3B).

Figure 5D:
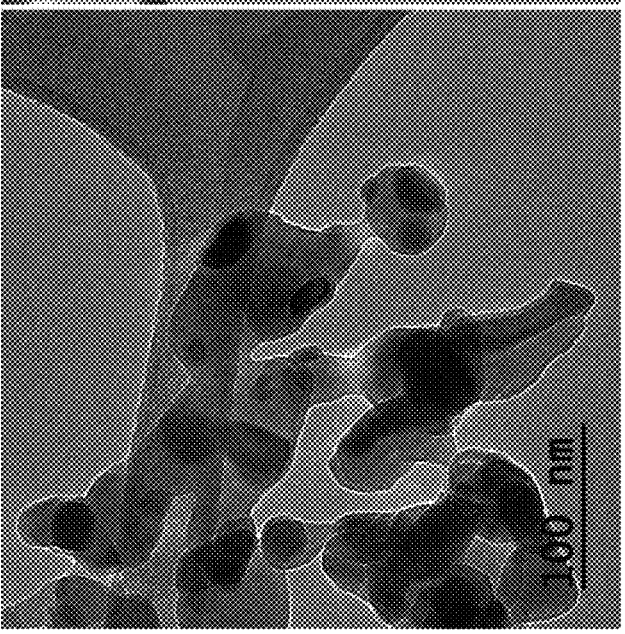
FIG. 5D is a TEM image of a $HfB_2$ aerogel.

Transmission electron microscopy (TEM) images also showed that though there was a population of large particles present in the ZrB$_2$ aerogel (FIG. 5B) and the HfB$_2$ aerogel (FIG. 5D) after borothermal reduction, the majority of particles were less than 100 nm in diameter. Some larger (100-200 nm) particles were present in the ZrB$_2$ aerogel (FIG. 5B) and HfB$_2$ aerogel (FIG. 5D), though the majority of the particles were still less than 100 nm.

Porosity of the metal boride aerogels was determined by gas adsorption. Nitrogen porosimetry was performed to determine surface area of the ZrB$_2$ and HfB$_2$ aerogels, which 0.184±0.008 and 0.328±0.010 W/(m K), respectively, more than two orders of magnitude (300 times) lower than the thermal conductivity of fully dense ZrB$_2$.

FIG. 6 illustrates the thermal conductivity ($\lambda$) of ZrB$_2$ (right axis) as a function of density ($\rho$) (bottom axis). FIG. 6 also illustrates the Young's modulus (E) of ZrB2 and HfB$_2$ aerogels and xerogels (left axis). The open data points represent ZrB$_2$ or HfB$_2$ properties at full density (according to values generally found in the literature). Error bars are equal to or less than the size of the data symbols.

Power-law fits of the data gave scaling exponents of $\alpha$=2.25±0.42 for thermal conductivity of ZrB$_2$, which is slightly higher than that of carbon aerogels ($\alpha$=1.5) but in the expected range. Without wishing to be bound by any theory, it is believed that the observed super-linear dependence allows aerogels to perform so well as thermal insulators.

FIG. 6 also presents Young's modulus (E) of ZrB$_2$ and HfB$_2$ as a function of density ($\rho$), as shown in Equation 3, where $\tau$ is the scaling exponent.

$$E \propto \rho^\tau \quad \text{Equation 3}$$

The modulus is also observed to depend super-linearly on density. Power-law fits on the modulus data give scaling values of $\tau$=3.5±0.19 and 2.92±0.70 for ZrB$_2$ and HfB$_2$, respectively. The exponent values for both ZrB$_2$ and HfB$_2$ are consistent with a form of irregular, fractal morphology ($\tau$>3) and slightly higher than that of graphene-derived carbon aerogels ($\tau$=2.5) produced by a conventional method.

Figure 7A:
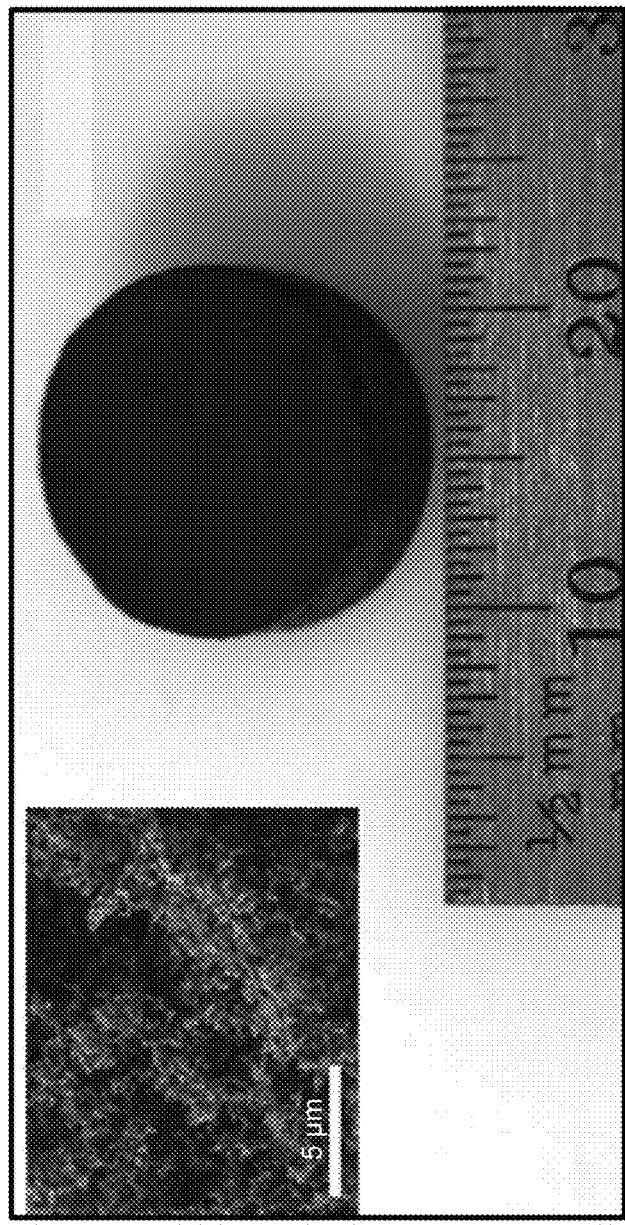
FIG. 7A is an image of a monolith $ZrB_2$ aerogel as synthesized, including an inset of a scanning electron micrograph (SEM) image of the grain structure of a portion of the $ZrB_2$ aerogel as synthesized, according to one aspect of an inventive concept.
Figure 7B:
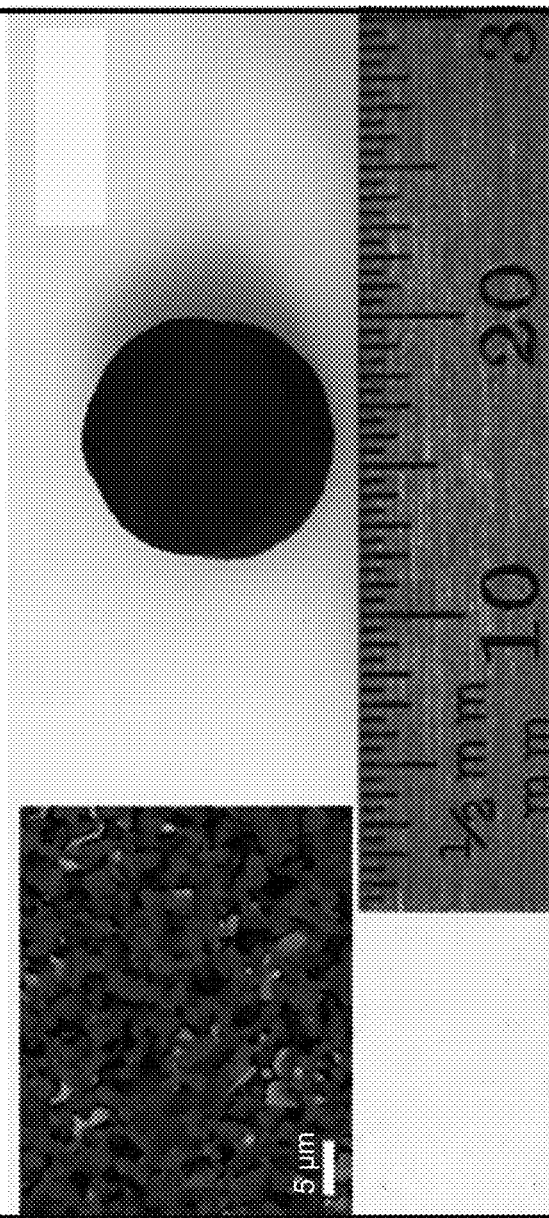
FIG. 7B is an image of the $ZrB_2$ aerogel of FIG. 7A heated at 2000° C. for 30 minutes in an inert atmosphere, according to one aspect of an inventive concept. An inset depicts a scanning electron micrograph image of the grain structure of a portion of the heated $ZrB_2$ aerogel.

High temperature survivability of ZrB$_2$ aerogel was demonstrated by subjecting a monolith to 2000° C. for 30 min under flowing helium. FIGS. 7A and 7B show that the monolith maintains its form before (FIG. 7A) and after (FIG.

7B) heat treatment. There was some shrinkage on the order of 35%, comparing the monolith of FIG. 7A before heating to the monolith of FIG. 7B after heating.

In addition, grain growth was demonstrated after heating. A comparison of the SEM image (inset of FIG. 7A) of the material before heating to the SEM image (inset of FIG. 7B) of the material after heating showed remarkable grain growth, which was expected as fine-grained $ZrB_2$ is known to sinter at ambient pressure at around 2100° C.

In Use

Various inventive concepts described herein may expand the use of metal borides to include thermal insulators at extreme high temperatures and also provide a route to very fine metal boride nanoparticles that could be used for full density or composite materials.

Various inventive concepts described herein may be used in heat shielding, insulation, membranes, catalysts, catalyst support, filters, and superconductors.

The inventive concepts disclosed herein have been presented by way of example to illustrate the myriad features thereof in a plurality of illustrative scenarios, inventive concepts, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various inventive concepts have been described above, it should be understood that they have been presented by way of example only, and not limitation. Thus, the breadth and scope of an inventive concept of the present invention should not be limited by any of the above-described exemplary inventive concepts but should be defined only in accordance with the following claims and their equivalents.

What is claimed is:

1. A metal boride aerogel, comprising:
   a three-dimensional aerogel structure comprising metal boride particles having an average diameter of less than one micron,
   wherein the metal boride particles consist of a single metal and boron.

2. The metal boride aerogel as recited in claim 1, wherein the metal boride particles include particles having a metal boride selected from the group consisting of: hafnium boride, zirconium boride, and titanium boride.

3. The metal boride aerogel as recited in claim 1, wherein the metal boride particles in the three-dimensional aerogel structure include a metal selected from the group consisting of: hafnium, zirconium, titanium, vanadium, molybdenum, tantalum, niobium, chromium, tungsten, iron, cobalt, nickel, lanthanum, magnesium, and uranium.

4. A metal boride aerogel comprising: a three-dimensional aerogel structure comprising metal boride particles having an average diameter of less than one micron,
   wherein the metal boride aerogel has, at least in part, a composition of metal boride carbon oxide denoted as $MB_xC_yO_z$, wherein x is a number in a range of greater than zero and less than ten,
   wherein y is a number in a range of greater than zero and less than ten,
   wherein z is a number in a range of greater than or equal to zero and less than ten.

5. The metal boride aerogel as recited in claim 1, wherein the average diameter is less than about 100 nanometers.

6. The metal boride aerogel as recited in claim 1, wherein the metal boride aerogel is electrically insulating.

7. The metal boride aerogel as recited in claim 6, wherein the metal boride aerogel has an electrical conductivity of about 1 siemens per centimeter or less.

8. The metal boride aerogel as recited in claim 1, wherein a thermal conductivity of the metal boride aerogel is in a range of less than about 10 watts per meter kelvin and greater than zero.

9. The metal boride aerogel as recited in claim 1, wherein the metal boride aerogel comprises a metal boride material, the metal boride material having a melting temperature in a range of greater than 1000 degrees Celsius and less than 3500 degrees Celsius.

10. The metal boride aerogel as recited in claim 1, having a surface area in a range of about 50 milligram per cubic centimeter o about 1,000 milligram per cubic centimeter.

11. The metal boride aerogel as recited in claim 1, wherein the metal boride aerogel is essentially free of metal oxide.

12. The metal boride aerogel as recited in claim 1, wherein the aerogel is a single phase aerogel.

13. The metal boride aerogel as recited in claim 1, wherein the aerogel is essentially free of boron oxide.

14. The metal boride aerogel as recited in claim 1, wherein the aerogel has essentially no free boron metal.

15. The metal boride aerogel as recited in claim 1, wherein a hardness of the metal boride aerogel is in a range of about 0.5 to about 20 Megapascal.

16. The metal boride aerogel as recited in claim 1, wherein the metal boride particles have a melting temperature in a range of greater than 1000° C. to less than about 3500° C. thereby rendering the metal boride aerogel resistant to sintering.

17. A method for forming the metal boride aerogel as recited in claim 1, the method comprising:
   dispersing boron nanoparticles in a solution of a metal salt;
   forming a boron-loaded metal oxide precursor gel using the dispersed boron nanoparticles in the solution of the metal salt;
   drying the boron-loaded metal oxide precursor gel to form a boron-loaded metal oxide precursor aerogel; and
   heating the boron-loaded metal oxide precursor aerogel to form the metal boride aerogel, wherein the metal boride aerogel is essentially free of metal oxide.

18. The method as recited in claim 17, wherein the metal salt includes one metal selected from the group consisting of: hafnium, zirconium, titanium, vanadium, niobium, tantalum, chromium, molybdenum, tungsten, iron, cobalt, nickel, lanthanum, germanium, yttrium, manganese and magnesium.

19. The method as recited in claim 17, wherein the metal salt is selected from the group consisting of: metal chloride, metal nitride, and metal alkoxide.

20. The method as recited in claim 17, wherein an average diameter of the boron nanoparticles is in a range of greater than zero and less than ten microns.

21. The method as recited in claim 17, wherein an average diameter of the boron nanoparticles is in a range of greater than zero and less than 100 nanometers.

22. The method as recited in claim 17, wherein forming the boron-loaded metal oxide precursor gel comprises an epoxide-assisted sol-gel process.

23. The method as recited in claim 22, wherein the epoxide-assisted sol-gel process includes an epoxide selected from the group consisting of: propylene oxide, trimethylene oxide, dimethylene oxide, and ethylene oxide.

24. The method as recited in claim 22, wherein a duration of time of forming boron-loaded metal oxide precursor gel is greater than zero minutes and less than ten minutes.

\* \* \* \* \*